(12) United States Patent
Jeong et al.

(10) Patent No.: US 10,144,822 B2
(45) Date of Patent: Dec. 4, 2018

(54) TRANSPARENT ARTIFICIAL CHIPS AND ARTIFICIAL MARBLE COMPRISING THE SAME

(71) Applicant: Lotte Advanced Materials Co., Ltd., Yeosu-si (KR)

(72) Inventors: Doo Kyo Jeong, Uiwang-si (KR); Chang Ho Son, Uiwang-si (KR); Dong Jun Kim, Uiwang-si (KR); Chang Ho Shin, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 14/810,647

(22) Filed: Jul. 28, 2015

(65) Prior Publication Data

US 2016/0032083 A1 Feb. 4, 2016

(30) Foreign Application Priority Data

Aug. 1, 2014 (KR) .................. 10-2014-0098763

(51) Int. Cl.

| | |
|---|---|
| *C08L 33/08* | (2006.01) |
| *C08L 33/14* | (2006.01) |
| *C08K 7/06* | (2006.01) |
| *C04B 14/38* | (2006.01) |
| *C04B 111/54* | (2006.01) |
| *C04B 16/04* | (2006.01) |
| *C04B 26/06* | (2006.01) |
| *C04B 26/08* | (2006.01) |
| *C08K 3/08* | (2006.01) |
| *C04B 26/00* | (2006.01) |
| *C04B 26/14* | (2006.01) |
| *C08K 3/20* | (2006.01) |

(Continued)

(52) U.S. Cl.
CPC .............. *C08L 33/08* (2013.01); *C04B 26/00* (2013.01); *C04B 26/08* (2013.01); *C04B 26/14* (2013.01); *C08K 3/08* (2013.01); *C08K 3/20* (2013.01); *C08K 7/02* (2013.01); *C08K 7/06* (2013.01); *C08L 33/04* (2013.01); *C08L 33/14* (2013.01); *C04B 2111/545* (2013.01)

(58) Field of Classification Search
CPC .. C08K 3/08; C08K 7/06; C08L 63/10; C08L 33/14; C04B 26/00; C04B 26/06; C04B 26/08; C04B 2111/545
See application file for complete search history.

(56) References Cited

U.S. PATENT DOCUMENTS

2009/0203818 A1* 8/2009 Son .................. C04B 26/16
524/114
2014/0350160 A1 11/2014 Jeong et al.

FOREIGN PATENT DOCUMENTS

KR 10-2013-0074744 A 7/2013

* cited by examiner

*Primary Examiner* — Kregg T Brooks
(74) *Attorney, Agent, or Firm* — Addition, Higgins & Pendleton, P.A.

(57) ABSTRACT

The present invention relates to transparent chips for artificial marble and artificial marble including the same. The transparent chips for artificial marble include (A) a halogenated epoxy acrylate resin and (B) metal fibers. The transparent chips are fabricated by adding metal fibers to a transparent resin. The transparent chips for artificial marble can implement both linear stripe patterns and three-dimensional effects inherent thereto, thereby providing an aesthetically pleasing appearance.

10 Claims, 2 Drawing Sheets

(51) Int. Cl.
*C08K 7/02* (2006.01)
*C08L 33/04* (2006.01)

TRANSPARENT ARTIFICIAL CHIPS AND ARTIFICIAL MARBLE COMPRISING THE SAME

CROSS-REFERENCE TO RELATED APPLICATION

This application claims priority to and the benefit of Korean Patent Application No. 10-2014-0098763, filed on Aug. 1, 2014, in the Korean Intellectual Property Office, the entire disclosure of which is incorporated herein by reference.

FIELD OF THE INVENTION

The present invention relates to transparent chips for artificial marble and artificial marble including the same.

BACKGROUND

Recently, with increasing demand for construction of luxurious and comfortable buildings, marble has attracted attention as a construction material. However, despite high hardness and beautiful patterns, natural marble has not been popularized due to high cost, high weight, and vulnerability to external shock.

Unlike natural marble, artificial marble can implement various images and patterns. In addition, artificial marble can have a pleasing appearance and good workability and is lighter and stronger than natural marble. Such artificial marble is widely used as various interior/exterior materials for butcher blocks, dressing tables, washstands, counters, walls, floors, furniture, and the like.

Artificial marble can be fabricated by mixing a resin component with natural crushed stone, minerals, and engineered stone, followed by curing. The shape, color, and mix proportions of engineered stone and the like are considered important to realize pleasing appearance of artificial marble.

Engineered stone is fabricated by preparing resin panels and crushing the panels. Engineered stone can realize various textures and patterns according to the kind and composition of a resin material for panels and the content of inorganic fillers. Engineered stone is divided into transparent chips having high transparency and marble chips having low transparency.

Thereamong, transparent chips have difficulty in implementing stripe patterns. Examples of a method for forming stripe patterns on engineered stone include using a liquid resin and using natural or synthetic fibers. However, use of the liquid resin can cause deterioration in three-dimensional effects of artificial marble. In addition, use of the natural or synthetic fibers can cause transparent chips to have unfilled surfaces or suffer from bubbling due to pores in the fibers. This can cause significant deterioration in fouling resistance and appearance of artificial marble. Further, resin panels containing natural or synthetic fibers can be difficult to crush into a desired size and shape due to considerable difference in crushing strength between the resin panels and the fibers.

Therefore, there is a need for improved artificial marble chips which allow easy formation of linear stripe patterns and can provide three-dimensional effects inherent to transparent chips while implementing texture of natural stone, and artificial marble including the same.

SUMMARY

Embodiments provide transparent chips for artificial marble including (A) a halogenated epoxy acrylate resin and (B) metal fibers.

The transparent chips for artificial marble may include about 0.1 parts by weight to about 10 parts by weight of the (B) metal fibers based on about 100 parts by weight of the (A) halogenated epoxy acrylate resin.

The (A) halogenated epoxy acrylate resin may have a weight average molecular weight of about 500 g/mol to about 3,000 g/mol.

The metal fibers may have a Barcol hardness of about 10 to about 40, an average length of about 1 mm to about 10 mm, and an average diameter of about 5 μm to about 20 μm.

The metal fibers may include at least one of aluminum fibers, nickel fibers, and aluminum/nickel alloy fibers.

The transparent chips for artificial marble may have a Barcol hardness of about 25 to about 40.

Embodiments also provide artificial marble including: about 40 parts by weight to about 100 parts by weight of the transparent chips for artificial marble as set forth above; and about 120 parts by weight to about 180 parts by weight of inorganic fillers, each based on about 100 parts by weight of a (meth)acrylate syrup including about 1 wt % to about 30 wt % of a (meth)acrylate polymer and about 70 wt % to about 99 wt % of a (meth)acrylate monomer.

The (meth)acrylate monomer may be a (meth)acrylate monomer including at least one of a $C_1$ to $C_{20}$ aliphatic hydrocarbon group, a $C_3$ to $C_{20}$ cycloaliphatic hydrocarbon group, and a $C_5$ to $C_{20}$ aromatic hydrocarbon group.

The inorganic fillers may include at least one of calcium carbonate, aluminum hydroxide, silica, alumina, and magnesium hydroxide.

The artificial marble may further include marble chips, wherein the marble chips may further include at least one of general acrylate resin chips and unsaturated polyester chips.

The artificial marble may have a Barcol hardness of about 30 to about 40.

The transparent chips according to exemplary embodiments of the present invention can implement both linear stripe patterns and three-dimensional effects similar to natural stone, thereby providing an aesthetically pleasing appearance.

In addition, artificial marble including the transparent chips for artificial marble can have excellent smoothness and/or sanding properties to allow a surface thereof to be processed uniformly and can implement three-dimensional effects similar to natural stone while exhibiting excellent antibacterial properties and/or fouling resistance.

DETAILED DESCRIPTION

Figure 1:
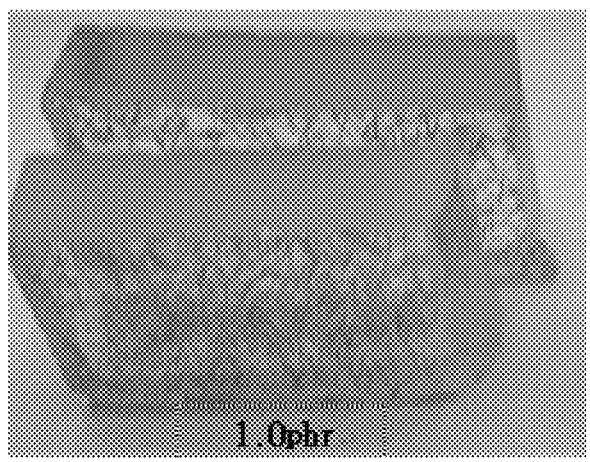
FIG. 1 is a digital image of a transparent chip sheet prepared in Preparative Example 1.

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

It should be understood that the following embodiments are provided for complete disclosure and thorough understanding of the invention by those skilled in the art. In addition, unless otherwise stated, technical and scientific terms as used herein have a meaning generally understood by those skilled in the art. Descriptions of known functions and constructions apparent to those skilled in the art will be omitted.

Embodiments relate to transparent chips for artificial marble, which includes a halogenated epoxy acrylate resin and a metal fiber. The transparent chips can prevent metal fibers from sinking and being non-uniformly formed due to difference in specific gravity between a matrix and the metal fibers, thereby implementing uniform linear stripe patterns while exhibiting excellent transparency. When the transparent chips are used, it is possible to fabricate artificial marble which implements three-dimensional effects similar to natural stone and has a pleasing appearance. In addition, the transparent chips can improve sanding properties and/or smoothness of the artificial marble. Accordingly, the artificial marble can exhibit enhanced antibacterial properties and/or fouling resistance.

Next, each component will be described in detail.

Transparent Chip for Artificial Marble

Transparent chips for artificial marble according to exemplary embodiments include (A) a halogenated epoxy acrylate resin and (B) a metal fiber. The transparent chips for artificial marble may be fabricated using a composition for transparent chips including the (A) halogenated epoxy acrylate resin and the (B) metal fiber. The transparent chips for artificial marble may be fabricated by a process in which the composition for transparent chips is cured to prepare a resin sheet, followed by crushing the resin sheet.

(A) Halogenated Epoxy Acrylate Resin

According to exemplary embodiments, a halogenated epoxy acrylate resin may be added to improve transparency, heat resistance, and/or mechanical properties of the transparent chips for artificial marble.

The halogenated epoxy acrylate resin may include any halogenated epoxy acrylate resin well known in the art. The halogenated epoxy acrylate resin may be an acrylate resin including a halogen group and an epoxy group. Examples of the halogenated epoxy acrylate resin may include without limitation halogenated bisphenol A type epoxy acrylate resins, halogenated bisphenol S type epoxy acrylate resins, halogenated tetraphenylethane epoxy acrylate resins, phenol novolac type halogenated epoxy acrylate resins, and the like. These resins may be used alone or as a mixture thereof.

In exemplary embodiments, the halogenated epoxy acrylate resin may be a halogenated bisphenol A type epoxy acrylate, for example, a brominated bisphenol A type epoxy acrylate. In this case, the transparent chips can exhibit further enhanced durability and/or transparency.

The halogenated epoxy acrylate resin may be prepared by any typical method known in the art.

The halogenated epoxy acrylate resin may have a weight average molecular weight of about 500 g/mol to about 3,000 g/mol. Within this range, the resin for transparent chips can exhibit excellent viscosity, moldability, and/or mechanical properties. In addition, within this range, a concave phenomenon can be more effectively prevented when the halogenated epoxy acrylate resin is used in artificial marble.

As used herein, the term "concave phenomenon" refers to interfacial faults caused by difference in hardness between chips and a matrix. Generally, when the chips and the matrix have similar hardness, artificial marble fabricated using the transparent chips can exhibit excellent smoothness and sanding properties without suffering from the concave phenomenon even after surface machining.

(B) Metal Fiber

Metal fibers according to exemplary embodiments of the invention can implement linear stripe patterns on the transparent chips for artificial marble and can increase specific gravity of the transparent chips. As a result, the metal fibers can retain a texture inherent to metal fabrics, thereby implementing a natural stone appearance. In addition, the metal fibers have an elongated shape and thus can form aesthetically pleasing patterns on the transparent chips. Also, unlike natural or synthetic fibers, the metal fibers do not have pores therein. Thus, it is possible to prevent formation of pores in the transparent chips. Accordingly, artificial marble fabricated using the transparent chips can exhibit considerably low internal and/or external porosity, which can further enhance appearance.

The metal fibers may have a Barcol hardness of about 10 to about 40. Within this range, the concave phenomenon can be more effectively prevented. In some embodiments, the metal fibers may have a Barcol hardness of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40. For example, the metal fibers may have a Barcol hardness of about 25 to about 35, and as another example about 25, 26, 27, 28, 29, 30, 31, 32, 33, 34, or 35.

Within this range, the metal fibers can have a Barcol hardness similar to inorganic fillers, whereby the artificial marble can exhibit further enhanced sanding properties and/or smoothness. As a result, the artificial marble can have further improved surface workability, while exhibiting further enhanced antibacterial characteristics and/or fouling resistance.

The metal fibers may have an average length of about 1 mm to about 10 mm and an average diameter of about 5 μm to about 20 μm. For example, the metal fibers may have an average length of about 3 mm to about 6 mm and an average diameter of about 10 μm to about 15 μm.

When the metal fibers have an average length and an average diameter in the above range, the metal fibers can be uniformly dispersed in the halogenated epoxy acrylate resin before curing. In addition, linear stripe patterns, which are similar to natural stone and thus aesthetically pleasing, can be formed on the transparent chips including the metal fibers, and the artificial marble can have further enhanced sanding properties.

The metal fibers may have a sectional aspect ratio of about 1:1 to about 1:4, for example about 1:1 to about 1:2, and as another example about 1:1 to about 1:1.5.

Within this range, linear stripe patterns, which are similar to natural stone and thus aesthetically pleasing, can be formed on the transparent chips including the metal fibers, and the artificial marble can have further enhanced sanding properties.

Examples of the metal fibers may include without limitation aluminum fibers, nickel fibers, aluminum/nickel alloy fibers, and the like, and mixtures thereof. In exemplary embodiments, the metal fibers may include aluminum fibers. In this case, the metal fibers can be uniformly dispersed in the halogenated epoxy acrylate resin before curing.

The metal fibers according to the embodiment may be present in an amount of about 0.1 parts by weight to about 10 parts by weight based on about 100 parts by weight of the halogenated epoxy acrylate resin. In some embodiments, the metal fibers may be present in an amount of about 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments, the amount of the metal fibers can be in a range from about any of the foregoing amounts to about any other of the foregoing amounts. For example, the metal fibers may be present in an amount of about 1 part by weight to about 5 parts by weight, as another example, about 1 part by weight, 2 parts by weight, 3 parts by weight, 4 parts by weight, or 5 parts by weight.

Within this range, the metal fibers can be uniformly dispersed, thereby implementing excellent linear stripe patterns on the transparent chips. In addition, within this range, the transparent chips can exhibit further enhanced transparency and three-dimensional effects. Accordingly, formation of linear stripe patterns and the three-dimensional effect can be adjusted by varying amount of the metal fibers within the aforementioned range.

A typical polymerization initiator may be further included to fabricate the transparent chips for artificial marble.

Examples of the polymerization initiator may include without limitation peroxides such as benzoyl peroxide, lauroyl peroxide, butyl hydroperoxide, cumyl hydroperoxide, and the like; azo compounds such as azobisisobutyronitrile, and the like. These polymerization initiators may be used alone or as a mixture thereof.

The polymerization initiator may be present in an amount of about 0.01 parts by weight to about 10 parts by weight based on about 100 parts by weight of the halogenated epoxy acrylate resin. Within this range, reactivity of the composition for transparent chips can be properly adjusted, whereby it is possible to fabricate transparent chips which have few uncured portions and exhibit a uniform degree of curing.

The transparent chips for artificial marble according to exemplary embodiments may further include one or more typical additives to achieve desired properties and purposes in addition to the above components. Examples of the additives may include without limitation colorants, UV absorbers, antifoaming agents, silane coupling agents, curing accelerators, storage stabilizers, flame retardants, polymerization inhibitors, antistatic agents, and the like. These additives may be used alone or as a mixture thereof.

The additives may be properly included so as not to affect properties of the transparent chips for artificial marble.

The transparent chips for artificial marble according to exemplary embodiments may be fabricated by curing the composition for transparent chips as set forth above and crushing the cured composition into a desired size. For example, the transparent chips may be fabricated by a process in which the composition for transparent chips is poured into a sheet-shaped mold, followed by curing in an oven at about 60° C. to about 100° C. for about 30 minutes to about 2 hours to prepare a transparent chip sheet, and then crushing the sheet.

Shapes of the transparent chips according to the embodiment are not particularly limited to a certain shape, and may depend upon crushing method. For example, the transparent chips may have a natural stone shape when the transparent chips are randomly crushed. In this case, the transparent chips can impart an aesthetically pleasing appearance similar to natural stone to artificial marble.

In exemplary embodiments, the transparent chips for artificial marble may have a Barcol hardness of 25 to 40, as measured using a Barcol hardness tester (GYZJ 934-1, Barber Colman Company). In some embodiments, the transparent chips for artificial marble may have a Barcol hardness of about 25, 26, 27, 28, 29, 30, 31, 32, 33, 34, 35, 36, 37, 38, 39, or 40. Within this range, the transparent chips can impart excellent sanding properties and/or smoothness to artificial marble. In addition, the transparent chip can impart a natural stone appearance to artificial marble, thereby enhancing aesthetics. For example, the transparent chips may have a Barcol hardness of about 25 to about 35, as another example about 25, 26, 27, 28, 29, 30, 31, 32, 33, 34, or 35. Within this range, the artificial marble can have further enhanced sanding properties and/or smoothness. As a result, the artificial marble can exhibit further improved surface workability while providing further enhanced antibacterial properties and/or fouling resistance.

Artificial Marble

Next, artificial marble including the transparent chips for artificial marble as set forth above will be described in detail.

In embodiments, artificial marble may be formed with linear stripe patterns and may include a (meth)acrylate syrup, the transparent chips for artificial marble as set forth above, and inorganic fillers.

(Meth)acrylate Syrup

The (meth)acrylate syrup may include a mixture of a (meth)acrylate monomer and a polymer thereof (hereinafter, referred to as a (meth)acrylate polymer).

The (meth)acrylate monomer may include any (meth) acrylate monomer generally used in the art without limitation. The (meth)acrylate monomer may include at least one of a substituted or unsubstituted $C_1$ to $C_{20}$ aliphatic hydrocarbon group, a substituted or unsubstituted $C_3$ to $C_{20}$ cycloaliphatic hydrocarbon group, and/or a substituted or unsubstituted $C_5$ to $C_{20}$ aromatic hydrocarbon group.

As used herein, the term "$C_1$ to $C_{20}$ aliphatic hydrocarbon group" may include a $C_1$ to $C_{20}$ alkyl group, a $C_2$ to $C_{20}$ alkenyl group, and/or a $C_2$ to $C_{20}$ alkynyl group; the term "$C_3$ to $C_{20}$ alicyclic hydrocarbon group" may include a $C_3$ to $C_{20}$ cycloalkyl group, a $C_3$ to $C_{20}$ cycloalkenyl group, and/or a $C_3$ to $C_{20}$ cycloalkynyl group; and the term "$C_5$ to $C_{20}$ aromatic hydrocarbon group" may include a $C_5$ to $C_{20}$ aryl group. Also used herein, the term "substituted" can refer to one substituted with a substituent including a halogen atom (F, Cl, Br, I), a hydroxy group, a $C_1$ to $C_{20}$ alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a $C_1$ to $C_{20}$ alkyl group, a $C_2$ to $C_{20}$ alkenyl group, a $C_2$ to $C_{20}$ alkynyl group, a $C_6$ to $C_{20}$ aryl group, a C3 to $C_{20}$ cycloalkyl group, a $C_3$ to $C_{20}$ cycloalkenyl group, a $C_3$ to $C_{20}$ cycloalkynyl group, a $C_2$ to $C_{20}$ heterocycloalkyl group, a $C_2$ to $C_{20}$ heterocycloalkenyl group, a $C_2$ to $C_{20}$ heterocycloalkynyl group, a $C_3$ to $C_{20}$ heteroaryl group, or a combination thereof, instead of at least one hydrogen. As used herein, the term "hetero" can include at least one heteroatom such as N, O, S and/or P.

Examples of the (meth)acrylate monomer may include without limitation methyl(meth)acrylate, ethyl(meth)acrylate, 2-ethylhexyl(meth)acrylate, isopropyl(meth)acrylate, n-butyl(meth)acrylate, octyl(meth)acrylate, dodecyl(meth) acrylate, methylcyclohexyl(meth)acrylate, isobornyl(meth) acrylate, phenyl(meth)acrylate, benzyl(meth)acrylate, chlorophenyl(meth)acrylate, methoxyphenyl(meth)acrylate, ethylene glycol di(meth)acrylate, 1,2-propyleneglycol di(meth)acrylate, 1,4-butanediol di(meth)acrylate, diethyleneglycol(meth)acrylate, neopentyl glycol di(meth)acrylate, and the like. These monomers may be used alone or as a mixture thereof.

The (meth)acrylate polymer may be a polymer prepared by polymerizing at least one of the aforementioned (meth) acrylate monomers. For example, the (meth)acrylate polymer may be a polymer of at least one of acrylic acid, methacrylic acid, methyl methacrylate, ethyl methacrylate, isopropyl methacrylate, n-butyl methacrylate, and/or 2-ethylhexyl methacrylate.

In exemplary embodiments, the (meth)acrylate polymer may be polymethylmethacrylate (PMMA), which is a polymer of methyl methacrylate. In this case, the (meth)acrylate syrup can exhibit excellent moldability and/or can enhance mechanical properties of the artificial marble.

The (meth)acrylate syrup may include about 1 wt % to about 30 wt % of the (meth)acrylate polymer and about 70 wt % to about 99 wt % of the (meth)acrylate monomer.

In some embodiments, the (meth)acrylate syrup may include the (meth)acrylate polymer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments, the amount of the (meth)acrylate polymer can be in a range from about any of the foregoing amounts to about any other of the foregoing amounts.

In some embodiments, the (meth)acrylate syrup may include the (meth)acrylate monomer in an amount of about 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments, the amount of the (meth)acrylate monomer can be in a range from about any of the foregoing amounts to about any other of the foregoing amounts.

If the amount of the (meth)acrylate polymer is less than 1 wt %, or the amount of the (meth)acrylate monomer is larger than 99 wt %, there is a concern of deterioration in mechanical properties of the artificial marble. In addition, if the amount of the (meth)acrylate polymer is larger than 30 wt %, or the amount of the (meth)acrylate monomer is less than 70 wt %, the viscosity of the (meth)acrylate syrup can be too high viscosity, which can reduce moldability.

Transparent Chip for Artificial Marble

In exemplary embodiments, the transparent chips included in artificial marble are the same as the transparent chips for artificial marble according to embodiments of the invention as set forth above. Such transparent chips can impart a three-dimensional linear stripe patterned appearance to the artificial marble.

The transparent chips for artificial marble may be present in an amount of about 40 parts by weight to about 100 parts by weight based on about 100 parts by weight of the (meth)acrylate syrup. In some embodiments, the transparent chips for artificial marble may be present in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 parts by weight. Further, according to some embodiments, the amount of the transparent chips can be in a range from about any of the foregoing amounts to about any other of the foregoing amounts.

If the amount of the transparent chips for artificial marble is less than about 40 parts by weight, linear stripe patterned appearance and/or natural stone-like texture may be insufficiently implemented. If the amount of the transparent chips for artificial marble is larger than about 100 parts by weight, there is a concern of deterioration in leveling properties and/or moldability due to increase in viscosity.

As described above, the transparent chips for artificial marble may be crushed by typical methods.

A mixture of two or more transparent chips that are different from one another, for example, and without limitation, chips having different contents (amounts), types, and/or sizes (length and/or average diameter) of metal fibers, and/or chips having different hardness, sizes, and/or shapes, may be used.

Inorganic Filler

Inorganic fillers may be added to enhance mechanical properties of the artificial marble and/or to impart natural stone-like texture to the artificial marble. Inorganic fillers may include any typical inorganic fillers well known in the art without limitation. Examples of the inorganic fillers may include without limitation calcium carbonate, aluminum hydroxide, silica, alumina, barium sulfate, and/or magnesium hydroxide.

The inorganic fillers may have an average particle diameter of about 1 µm to about 100 µm. For example, the inorganic fillers may have an average particle diameter of about 30 µm to about 80 µm, and as another example about 40 µm to about 50 µm. Within this range, it is possible to adjust a degree by which texture of the transparent chips is externally expressed, while implementing an entire appearance of the artificial marble in an aesthetically pleasing manner.

In exemplary embodiments, the inorganic fillers may include aluminum hydroxide having an average diameter of about 1 µm to about 100 µm. In this case, it is possible to fabricate artificial marble which has an easy-on-the-eye, marble-like appearance.

The inorganic fillers may be present in an amount of about 120 parts by weight to about 180 parts by weight based on about 100 parts by weight of the (meth)acrylate syrup. In some embodiments, the inorganic fillers may be present in an amount of about 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, or 180 parts by weight. Further, according to some embodiments, the amount of the inorganic fillers can be in a range from about any of the foregoing amounts to about any other of the foregoing amounts.

If the amount of the inorganic fillers is less than about 120 parts by weight, the artificial marble may have insufficient natural stone-like texture and/or reduced mechanical properties, and can suffer from deterioration in pattern expression and/or formability due to sinking of the transparent chips. If the amount of the inorganic fillers is larger than about 180 parts by weight, this can cause deterioration in moldability due to increased viscosity as well as detachment of the transparent chips and/or cracking during molding of artificial marble.

For example, the inorganic fillers may be present in an amount of about 130 parts by weight to about 170 parts by weight, and as another example about 140 parts by weight to about 160 parts by weight. Within this range, it is possible to impart excellent natural stone-like texture to the artificial marble while enhancing mechanical properties and/or formability of the artificial marble. In addition, within this range, it is possible to prevent delamination, detachment of the transparent chips, and/or cracking due to sinking of the transparent chips into the artificial marble, thereby implementing further enhanced appearance of the artificial marble.

In exemplary embodiments, the artificial marble may further include a typical polymerization initiator. Examples of the polymerization initiator may include without limitation peroxides such as benzoyl peroxide, lauroyl peroxide, butyl hydroperoxide, cumyl hydroperoxide, and the like; azo compounds such as azobisisobutyronitrile, and the like. These polymerization initiators may be used alone or as a mixture thereof.

In addition, the artificial marble may further include marble chips to implement a natural stone texture and/or enhance mechanical properties with minimal or no affect of properties of the artificial marble according to the present invention. The marble chips may include, for example, general acrylate resin chips and/or unsaturated polyester chips as known in the art.

The general acrylate resin chips are marble chips prepared from an acrylate resin and inorganic fillers, and the unsaturated polyester chips are marble chips prepared from an unsaturated polyester resin and inorganic fillers.

In exemplary embodiments, the artificial marble may further include one or more typical additives to achieve desired properties and purposes in addition to the aforementioned components. Examples of the additives may include without limitation colorants, UV absorbers, antifoaming agents, silane coupling agents, curing accelerators, storage stabilizers, flame retardants, polymerization inhibitors, antistatic agents, and the like. These additives may be used alone or as a mixture thereof.

In exemplary embodiments, the artificial marble may have a Barcol hardness of about 30 to about 40, as measured using a Barcol hardness tester (GYZJ 934-1, Barber Colman Company). Within this range, the artificial marble can provide three-dimensional effects similar to natural stone and thus can have an aesthetically pleasing appearance. In addition, the artificial marble can have enhanced sanding properties and/or smoothness, thereby exhibiting enhanced antibacterial properties and/or fouling resistance. For example, the artificial marble may have a Barcol hardness of about 30, 31, 32, 33, 34, 35, 36, 37, 38, 39, or 40. In this case, the artificial marble can exhibit further enhanced antibacterial properties and/or fouling resistance.

Next, the present invention will be described in more detail with reference to the following examples. However, it should be noted that these examples are provided for illustration only and should not be construed in any way as limiting the invention.

Evaluation of Properties (1) Barcol Hardness

Barcol hardness is measured using a Barcol hardness tester (GYZJ 934-1, Barber Colman Company) in accordance with ASTM D 2583.

(2) Evaluation of Concave Phenomenon

Each piece of artificial marble fabricated in the Examples is polished using 360 and 400 grit sandpaper, followed by observation with the naked eye. The artificial marble is rated as "poor" when a concave phenomenon occurs between chips and a matrix, and the artificial marble is rated as "good" when exhibiting excellent smoothness without suffering from a concave phenomenon.

(3) Evaluation of Linear Stripe Patterned Appearance

Each piece of artificial marble fabricated in the Examples is polished using 360 and 400 grit sandpaper, followed by observation with the naked eye. The artificial marble is rated as "good" when linear stripe patterns are uniformly distributed and clearly appear on a surface of the artificial marble, and the artificial marble is rated as "poor" when the linear stripe patterns are non-uniformly distributed and do not clearly appear.

Details of components used in Examples and Comparative Examples are as follows:

(A) Halogenated Epoxy Acrylate Resin

ATM-9000 produced by AEKYUNG CHEMICAL CO., LTD. is used.

(B) Metal Fiber

Aluminum fibers having an average length of 3 mm and an average diameter of 12 μm are used.

(C) (Meth)acrylate Syrup

A (meth)acrylate syrup obtained by mixing 16 wt % of IH830 produced by LG MMA Co., Ltd., as the (meth)acrylate polymer, with 84 wt % of methyl methacrylate (LG MMA Co., Ltd.), as the (meth)acrylate monomer is used.

(D) Inorganic Filler

H-WF-50-SP, aluminum hydroxide having an average particle diameter of 45 μm (Chalco Qingdao Co., Ltd) is used.

Preparative Examples 1 to 3: Preparation of Transparent Chip for Artificial Marble Preparative Example 1

As shown in Table 1, 1 part by weight of the (B) metal fibers is added to 100 parts by weight of the (A) halogenated epoxy acrylate resin, followed by mixing for 20 minutes and vacuum dehydration at 740 mmHg for 3 minutes, and then 0.04 parts by weight of an initiator (BPO 98, Allytech Co., Ltd.) and 0.05 parts by weight of another initiator (PERKADOX 16, Akzo Nobel Co., Ltd.) are added to the mixture, followed by mixing for 1 minute, thereby preparing a slurry for transparent chips. The slurry for transparent chips is poured into a mold to be evenly spread, followed by curing in an oven at 80° C. for 1 hour, thereby preparing transparent chips for artificial marble.

Preparative Examples 2 to 3

Transparent chips for artificial marble are prepared in the same manner as in Preparative example 1 except that amount of the (B) metal fibers is changed as listed in Table 1.

TABLE 1

| (unit: parts by weight) | Preparative Example 1 | Preparative Example 2 | Preparative Example 3 |
|---|---|---|---|
| Halogenated epoxy acrylate resin | 100 | 100 | 100 |
| Metal fiber | 1 | 3 | 5 |
| Barcol hardness of transparent chip | 29 | 30 | 30 |

Examples 1 to 3 and Comparative Examples 1 to 3: Fabrication of Artificial Marble Example 1

As shown in Table 2, 150 parts by weight of the (D) inorganic fillers and 50 parts by weight of the transparent chips prepared in Preparative Example 1 are introduced into the (C) (meth)acrylate syrup, followed by mixing for 20 minutes and vacuum dehydration at 740 mmHg for 3 minutes, and then 2.0 parts by weight of an initiator (Chemex MOM, Dong Sung Highchem Co., Ltd.) is added to the mixture, followed by stirring for 1 minute, thereby preparing a slurry for artificial marble. The prepared slurry is poured into a mold to be evenly spread, followed by curing in an oven at 80° C. for 1 hour, thereby fabricating artificial marble. The artificial marble is polished using 360 and 400 grit sandpaper, followed by evaluation as to Barcol hardness, a concave phenomenon, and a linear stripe patterned appearance.

Examples 2 to 3

Artificial marble is prepared in the same manner as in Example 1 except that the transparent chips prepared in Preparative Examples 2 to 3 are used instead of the transparent chips prepared in Preparative Example 1, as shown in Table 2, and evaluated as to the aforementioned properties. Results are shown in Table 2.

Comparative Example 1

As shown in Table 2, without using the transparent chips according to the present invention, 100 parts by weight of the (meth)acrylate syrup, 5 parts by weight of the metal fibers, and 150 parts by weight of the inorganic fillers are mixed for 20 minutes, followed by vacuum dehydration at 740 mmHg for 3 minutes, and then 2.0 parts by weight of an initiator (Chemex MOM, Dong Sung Highchem Co., Ltd.) is added to the mixture, followed by stirring for 1 minute, thereby preparing a slurry for artificial marble. The prepared slurry is poured into a mold to be evenly spread, followed by curing in an oven at 80° C. for 1 hour, thereby fabricating artificial marble. The artificial marble is polished using 360 and 400 grit sandpaper, followed by evaluation as to Barcol hardness, a concave phenomenon, and a linear stripe patterned appearance.

Comparative Examples 2 to 3

Artificial marble is fabricated in the same manner as in Example 3 except that a different amount of the transparent chips prepared in Preparative Example 3 is used instead of the amount of the transparent chips prepared in Preparative Example 3 used in Example 3, and 190 parts by weight of the (D) inorganic fillers are used, as shown in Table 2, and evaluated as to the aforementioned properties. Results are shown in Table 2.

parative Example 1. It can be seen that when transparent chips including metal fibers are included in artificial marble, linear stripe patterns can be easily formed, and three-dimensional effects similar to natural stone can be more effectively implemented.

As shown in Table 2, the artificial marble fabricated in Examples 1 to 3 have linear stripe patterns, exhibit excellent mechanical properties, do not suffer from a concave phenomenon, and exhibit three-dimensional effects similar to natural stone.

Although some embodiments have been described herein, it should be understood by those skilled in the art that these embodiments are given by way of illustration only and the present invention is not limited thereto. In addition, it should be understood that various modifications, variations, and alterations can be made by those skilled in the art without departing from the spirit and scope of the present invention.

Therefore, the scope of the invention should be limited only by the accompanying claims and equivalents thereof.

What is claimed is:

1. Transparent chips for artificial marble comprising a cured product of: about 100 parts by weight of (A) a halogenated epoxy acrylate resin; and about 1 part by weight to about 5 parts by weight of (B) metal fibers, wherein the transparent chips have a Barcol hardness of about 25 to about 35.

2. The transparent chips according to claim 1, wherein the (A) halogenated epoxy acrylate resin has a weight average molecular weight of about 500 g/mol to about 3,000 g/mol.

3. The transparent chips according to claim 1, wherein the metal fibers have a Barcol hardness of about 10 to about 40, an average length of about 1 mm to about 10 mm, and an average diameter of about 5 μm to about 20 μm.

4. The transparent chip according to claim 1, wherein the metal fibers comprise at least one of aluminum fibers, nickel fibers, and aluminum/nickel alloy fibers.

5. Artificial marble comprising a cured product of: about 40 parts by weight to about 100 parts by weight of the transparent chips for artificial marble according to claim 1; and about 120 parts by weight to about 180 parts by weight of inorganic fillers, each based on about 100 parts by weight

TABLE 2

| (unit: parts by weight) | (Meth)acrylate syrup | Transparent chip | Inorganic filler | Metal fiber | Barcol hardness | Concave phenomenon | Linear stripe pattern |
|---|---|---|---|---|---|---|---|
| Example 1 | 100 | Preparative Example 1 | 50 | 150 | — | 35 | Good | Good |
| Example 2 | 100 | Preparative Example 2 | 50 | 150 | — | 34 | Good | Good |
| Example 3 | 100 | Preparative Example 3 | 50 | 150 | — | 35 | Good | Good |
| Comparative Example 1 | 100 | — | — | 150 | 5 | 40 | Good | Poor |
| Comparative Example 2 | 100 | Preparative Example 3 | 20 | 190 | — | 35 | Good | Poor |
| Comparative Example 3 | 100 | Preparative Example 3 | 150 | 190 | — | 38 | Poor | Good |

Figure 2:
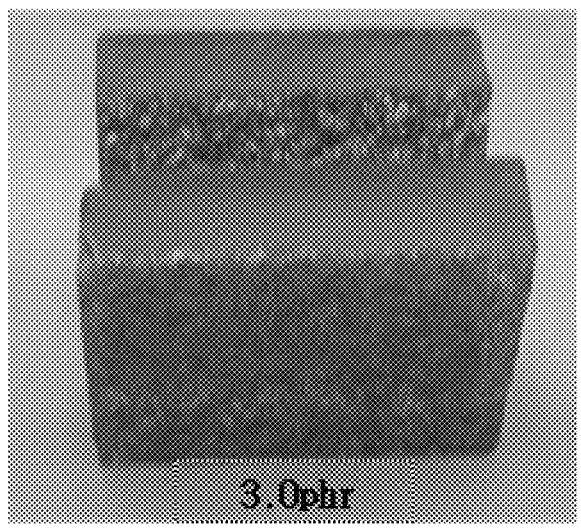
FIG. 2 is a digital image of a transparent chip sheet prepared in Preparative Example 2.
Figure 3:
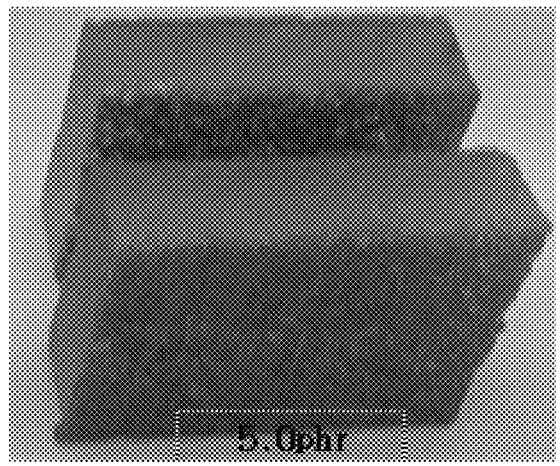
FIG. 3 is a digital image of a transparent chip sheet prepared in Preparative Example 3.

FIGS. 1 to 3 are digital images of transparent chips with different contents (amounts) of metal fibers, prepared in Preparative Examples 1 to 3, respectively. FIGS. 1 to 3 show that linear stripe patterns are formed on transparent chips of Preparative Examples 1 to 3 without sinking the metal fibers due to difference in specific gravity.

Figure 4:
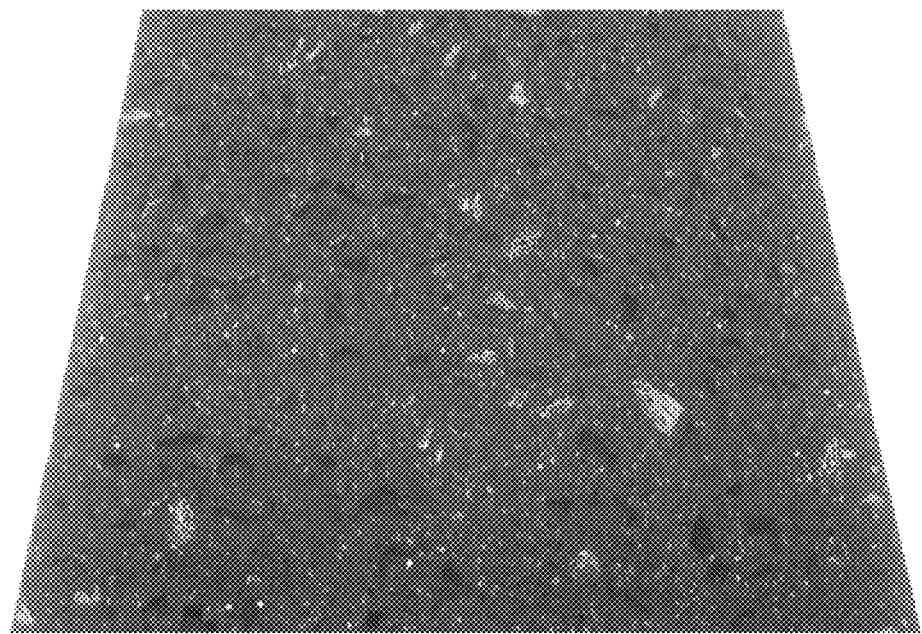
FIG. 4 is a digital image of artificial marble prepared in Example 1.

FIG. 4 is a digital image of artificial marble prepared in Example 1 including transparent chips fabricated in Preof a (meth)acrylate syrup, the (meth)acrylate syrup comprising about 1 wt % to about 30 wt % of a (meth)acrylate polymer and about 70 wt % to about 99 wt % of a (meth)acrylate monomer.

6. The artificial marble according to claim 5, wherein the (meth)acrylate monomer is a (meth)acrylate monomer including at least one of a $C_1$ to $C_{20}$ aliphatic hydrocarbon group, a $C_3$ to $C_{20}$ cycloaliphatic hydrocarbon group, and a $C_5$ to $C_{20}$ aromatic hydrocarbon group.

7. The artificial marble according to claim 5, wherein the inorganic fillers comprise at least one of calcium carbonate, aluminum hydroxide, silica, alumina, and magnesium hydroxide.

8. The artificial marble according to claim 5, further comprising marble chips, wherein the marble chips further comprise at least one of general acrylate resin chips and unsaturated polyester chips.

9. The artificial marble according to claim 5, wherein the artificial marble has a Barcol hardness of about 30 to about 40.

10. The transparent chip according to claim 1, wherein the transparent chips have a Barcol hardness of about 25 to about 30.

* * * * *